April 5, 1932.  H. C. ROBINSON  1,852,980
COIL TESTING EQUIPMENT
Filed April 19, 1929  4 Sheets-Sheet 3
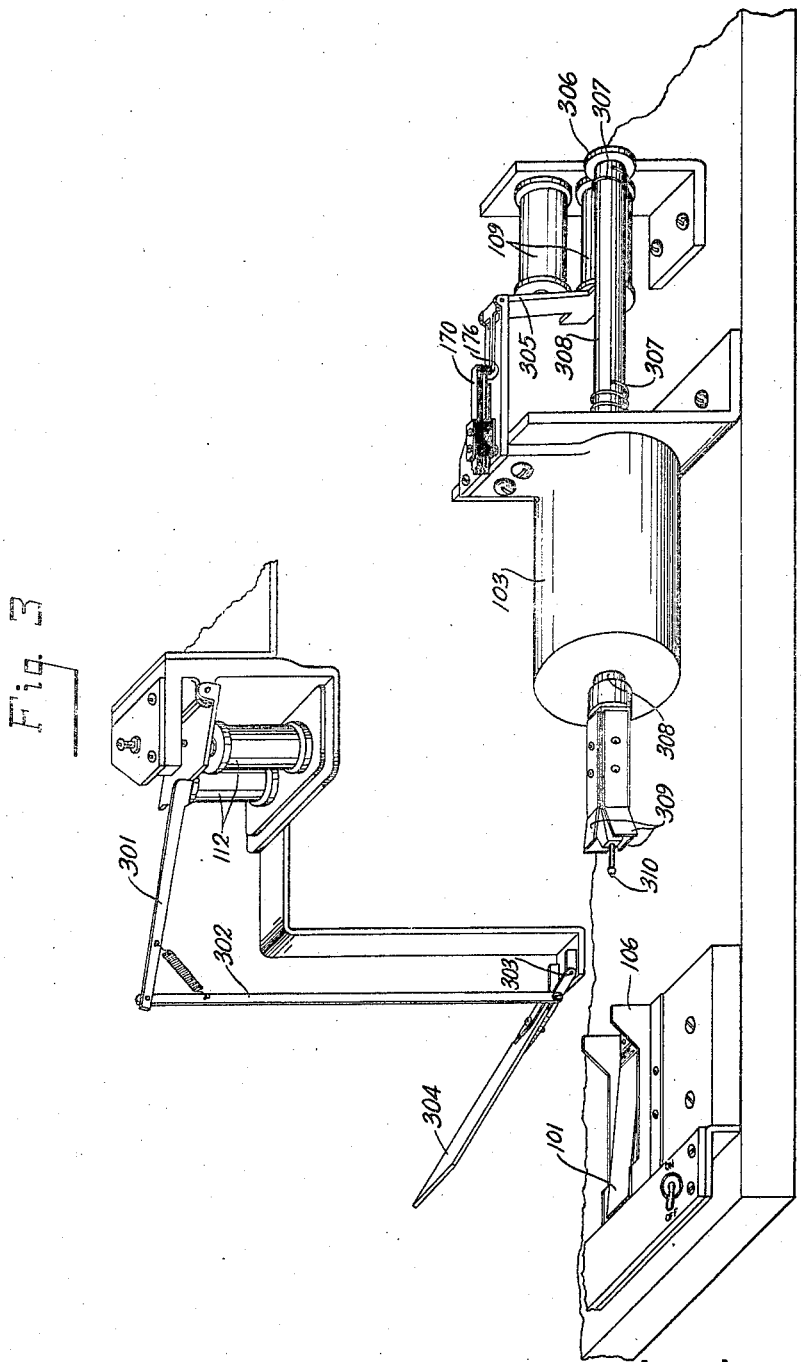
Inventor
Harold C. Robinson

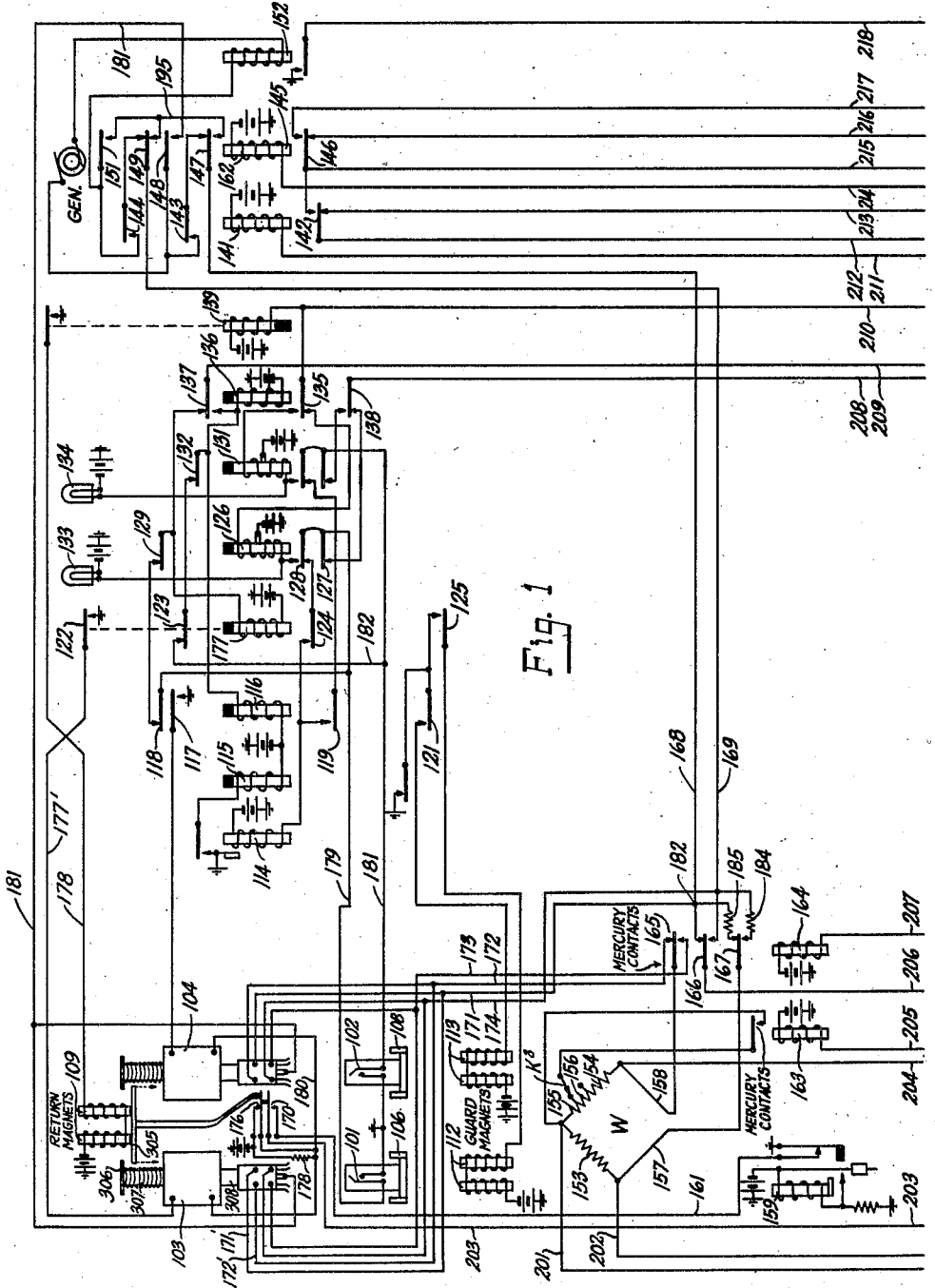

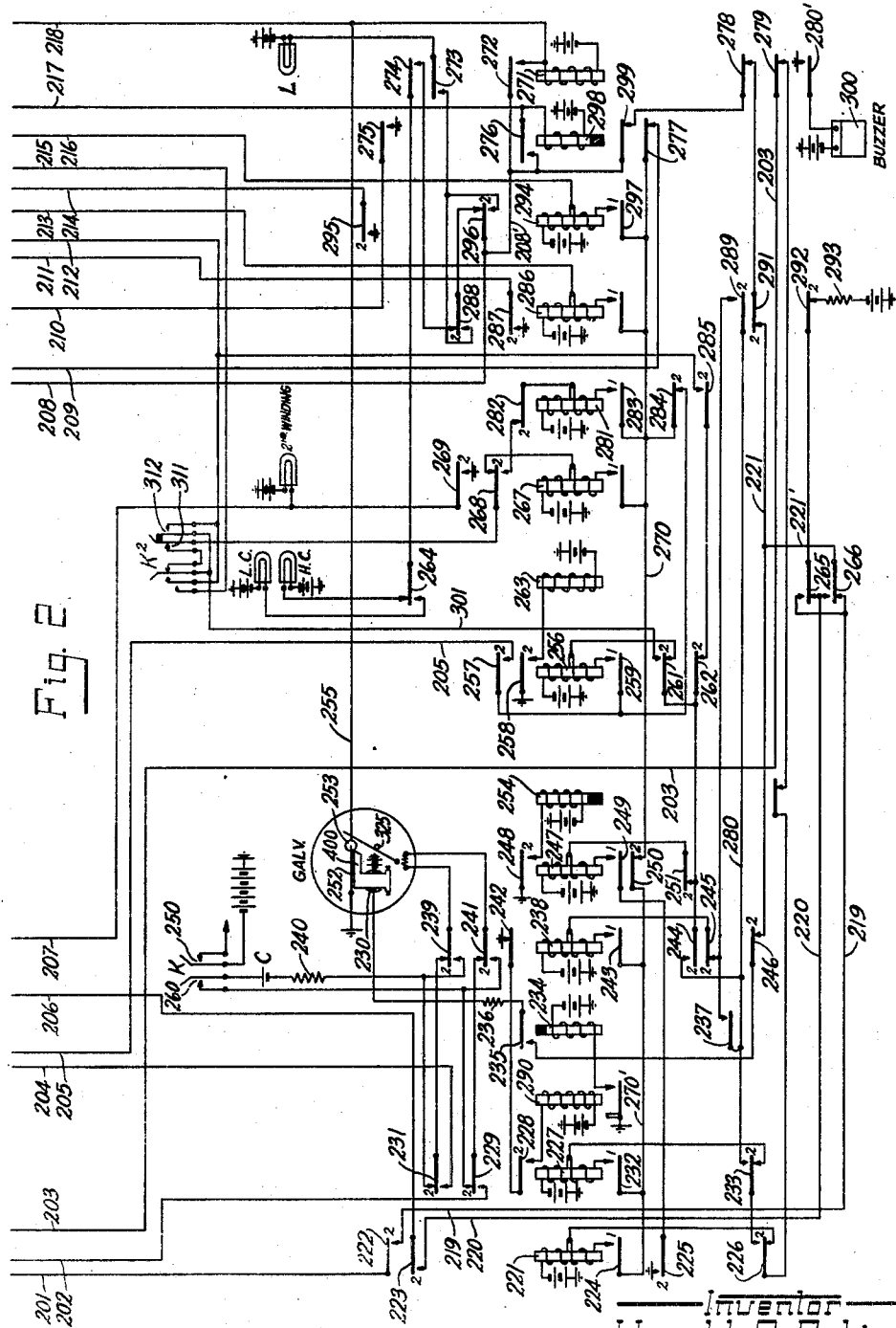

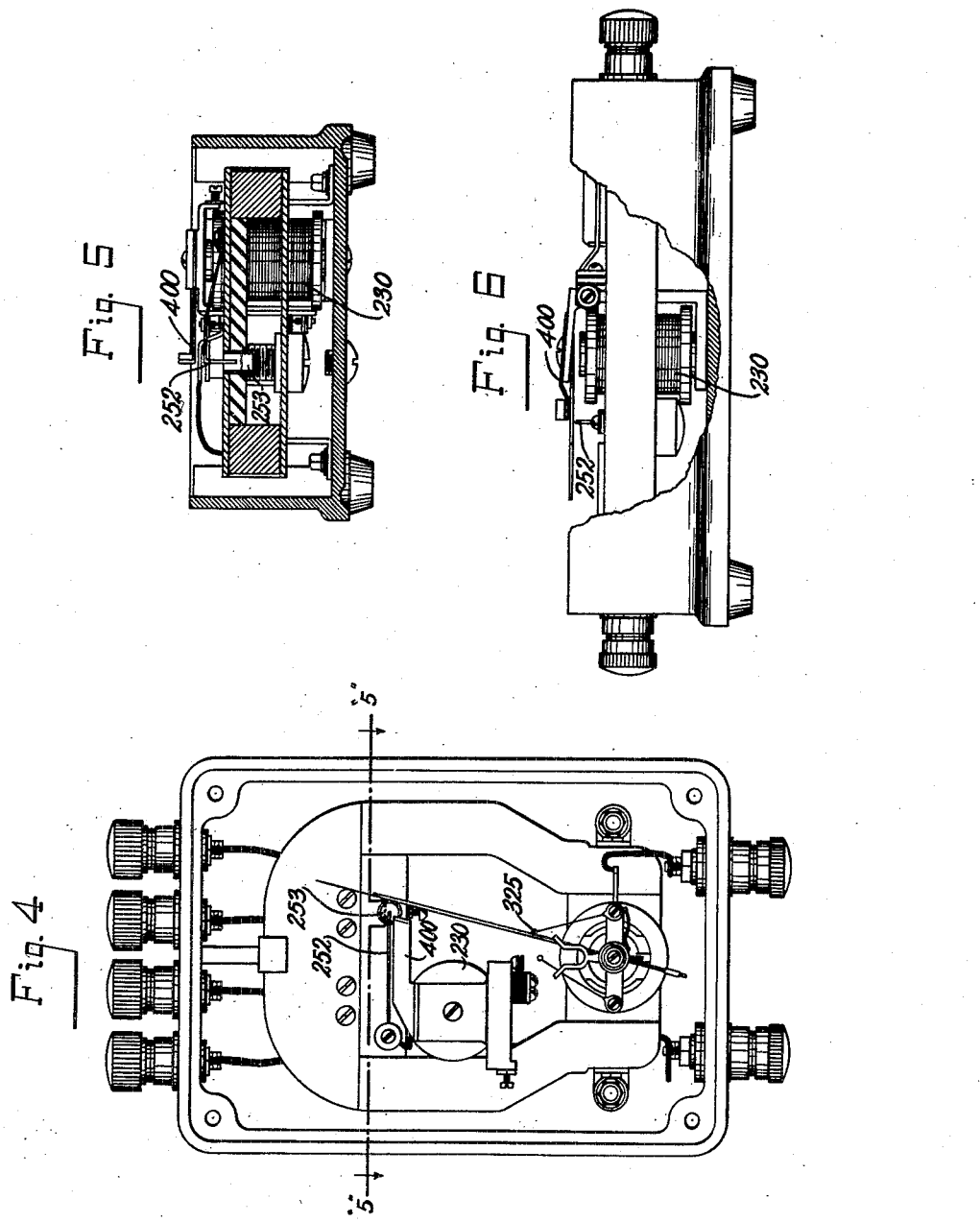

Patented Apr. 5, 1932

1,852,980

UNITED STATES PATENT OFFICE

HAROLD C. ROBINSON, OF CHICAGO, ILLINOIS, ASSIGNOR, BY MESNE ASSIGNMENTS, TO ASSOCIATED ELECTRIC LABORATORIES, INC., OF CHICAGO, ILLINOIS, A CORPORATION OF DELAWARE

COIL TESTING EQUIPMENT

Application filed April 19, 1929. Serial No. 356,398.

The present invention relates in general to coil testing equipment and more specifically to equipment for enabling an attendant to readily determine the condition of coils as regards the resistance of their windings, the insulation between the windings, and between the windings and the core.

The objects of the invention are to provide circuits and apparatus for enabling the foregoing tests to be made with accuracy and great rapidity.

The test equipment is so designed that, responsive to the placing of a coil in the set, a circuit is closed which causes the test equipment to operate through a number of cycles and making the foregoing mentioned tests in rapid succession. During any cycle of the test should a defect be found the equipment stops its testing operation, audibly warns the attendant that trouble exists and visually gives indication of the defect. On the other hand, if the coil is O. K., a visual signal so informs the attendant at the completion of the test. If the second coil has been placed into association with the equipment prior to the removal of the first, the equipment proceeds to test the second coil immediately following the test of the first. During the test of the second coil the attendant may remove the first tested coil and replace it with another. The testing equipment actuates at such a speed that an efficient attendant can test as many as five hundred coils per hour with a two-position equipment, such as shown, and from eight hundred to one thousand coils per hour when four-position test equipment is used.

In the testing operation the first cycle of a test determines if the resistance of one winding of a coil is less than a certain high limit allowed, while the second cycle determines if the resistance of that winding is greater than the low limit allowed. The other winding, if there are two, is then tested; the first test this time being for the low limit, and the second for the high limit. Both windings are then tested, first for breakdowns between each winding, and second, for breakdowns between the windings and the core.

The invention is illustrated in four sheets of drawings comprising Figs. 1 and 2, which, taken together, diagrammatically illustrate the invention; while Figs. 3–6 show the constructional details of certain of the apparatus only diagrammatically disclosed in Figs. 1 and 2.

The circuits and apparatus disclosed in Figs. 1 and 2 is, for the most part, of the type commonly found in automatic telephone systems. The relays 114 and 290 are of the weighted spring type and consequently are very slow in permanently closing their contacts. The character of these relays has been indicated by showing a weight on their make contact springs. Relays having the upper section of their cores shown solid are of the ordinary slow to pull up type; while those with the lower portion of their cores crosshatched are of the slow to release type. The two-step type of relay used has two windings: current flow to the upper winding alone while the lower winding is open or short circuited is only effective to actuate contacts marked "1", but when both windings are energized all contacts marked "2" are also actuated.

The impulse generating relay 159 is of the conventional pendulum type and periodically transmits impulses out over conductor 161 while the set is in use.

The guard magnets 112 and 113, while of the ordinary type of magnets used in telephone work, operate apparatus, not disclosed in Figs. 1 and 2, this apparatus is shown in detail in Fig. 3. Shown in conjunction with the guard magnets in this figure, are a coil loading position 106, and solenoid apparatus 103, which also are only diagrammatically illustrated in Fig. 2. The guard magnet has an armature 301 which, through the medium of lever 302 lowers a cover 304 over the coil loading position. The cover 304 is made of insulating material, so that an attendant is prevented from touching the coil and thus receiving an electrical shock while there is high voltage thereon, which occurs during breakdown tests. The solenoid and return magnet assembly 103, 109 also forming a part of the disclosure of Fig. 3 cooperate to actuate and restore plunger 308 and a spring assembly comprising spring sets 170 and 176. A spring 307 surrounding the plunger normally maintains it in the normal position, in which it is shown; while the spring set 176 normally holds the armature 305 of the return magnets 109 in operated position, as shown. Upon the energization of 103 the plunger is moved to the left, compressing spring 307 and moving the contact members 309 and 310 into engagement with the terminals and core of a coil assumed to be in the loading position designated 106. Near the end of the movement of the plunger 308 disk 306 engages and moves the return magnet armature 305 away from its poles, thereby actuating the spring sets 170 and 176. To return the plunger to its initial position solenoid 103 is deenergized and the return magnet 109 momentarily energized. The return magnet simply functions to assist the plunger restoring spring 307 to disengage its spring members 309 from the coil terminals.

The galvanometer Galv. diagrammatically shown in Fig. 2, is of the ordinary type, but has a mercury contact device attached thereto, actuated by an extension 400 of the armature of the magnet 230 when the galvanometer needle is in the path of movement of the armature extension. This construction is shown in detail in Figs. 4-6, inclusive. The needle normally rests against a flexible stop 325. To the left of the needle is a mercury well 253; and a contacting device lying in a plane below that of the needle has a bent down portion just out of contact with the mercury in well 253. Parallel to and in a plane slightly above that of the galvanometer needle is an armature extension 400, actuated by a coil 230. The arrangement is such that should the coil 230 be energized at a time when the galvanometer needle is between the extension 400 and the contact member 252, the extension 400 through the medium of the needle, will move contact member 252 into engagement with the mercury. It is believed that a better understanding of the invention will be had by describing the operations which take place during the test of coils.

The complete circuit arrangement shown is only used when double-wound coils are being tested and, therefore, in the description which follows it is assumed that such coils are being tested.

The set is conditional for testing by the operation of key K having springs 250, which, in practice, actually supply battery to the set, and springs 260 which complete a galvanometer needle restoring circuit including a dry cell and an associated 15,000-ohm resistance 240. This circuit may be traced from the positive pole of the dry cell C, through the resistance 240, the resting contact and armature 231, the resting contact and armature 239, through the galvanometer, the armature 241 and its resting contact, the armature 229 and its resting contact, through the contact springs 260 of the key K and back to the other terminal of the dry cell C. Although the galvanometer needle will restore to normal without the assistance of current from the dry cell C, the cell speeds up the restoring movement. The set is now ready for testing coils.

When a coil is placed in the coil loading position designated 106, Figs. 2 and 3, the weight of the coil actuates and closes start contacts 101, which are situated at the rear of the loading position. The closure of springs 101 completes an operating circuit for the position 1 start relay 177; which extends over conductor 179, grounded by the closure of springs 101; the armature 118 and its resting contact, resting contact and armature 129, and through the winding of relay 177 to battery. Ground is also supplied via the resting contact and armature 137, conductor 209, and the resting contact and armature 277, to holding conductors 270 and 270'. The relay 177, upon operating, at its armature 122 supplies ground to the conductor 177' leading to the solenoid 103 of the coil loading position designated 106. The other terminal of this solenoid is connected to battery by way of conductor 180 and solenoid contacts 176. The solenoid, therefore, actuates its plunger to connect the terminals of the conductors 171—174 with the terminals of the coil to be tested. The start relay 177 also, at its armature 123, opens the start circuit for the loading position designated as 108 to prevent a coil subsequently placed in this loading position, from interfering with the testing of the coil placed in position 106; at its armature 125 prepares a circuit for the guard magnet 112; and at its armature 124 completes a circuit for the timing relay 114, by way of the resting contact and armature 128 and the grounded start conductor 179. The relay 114 is of the weighted spring type and, therefore, although it closes the circuit for slow-to-pull-up timing relay 115, the weighted spring prevents the circuit being closed for a sufficient interval to permit the relay 115 to pull up for an appreciable interval. The relay 115, on operating, finally supplies operating ground to the guard magnet 112, via the working contact and armature 125 of the start relay 177. The guard magnet functions, as previously explained, to guard the attendant against accidental shock.

When the solenoid 103 operates, in addition to connecting the terminals of conductors 171—174 with the coil to be tested, by means of its disk 306 it actuates armature 305, which in turn opens the associated springs 176 and closes the associated springs 170. The opening of springs 176 simply causes the resistance 178 to be included in the holding circuit of the solenoid 103, to cut down the current flow; while the closing of contacts 170 connects an impulse conductor 161 to the conductor 203. The first impulse transmitted by the impulse relay 159, following the closure of contacts 170, passes over the conductor 203, through the armature 279 and its resting contact, the resting contact and armature of relay 254, and through the resting contact and armature 226 to the upper winding of two-step relay 221 and battery, causing this relay to actuate its armature 224.

The operation of this armature connects the lower winding of the two-step relay with the conductor 270', which, as previously explained, is supplied with ground potential by the grounded start conductor 179. During the short period during which ground is supplied to the relay 221 by the impulse generating relay 159, the lower winding of the relay 221 is short circuited and, therefore, only armature 224 is operated. However, at the termination of the impulse ground potential is removed from the mid-terminal of the two windings and they cooperate and cause the remaining armatures of the relay to be actuated.

The relay 221, upon fully operating, completes a circuit including a winding of the coil being tested, a standard resistance and the Wheatstone bridge W, which extends as follows: from ground on the start conductor 179, through armature 127 and its resting contact, resting contact and armature 138, conductor 208, branch 208', armature 299 and its resting contact, armature 278 and its resting contact, armature 291 and its resting contact, conductor 221, branch 221', armature 266 and its resting contact, conductor 219, working contact and armature 222, conductor 201, and to the upper apex of the bridge W; where the circuit divides, passing through the two fixed arms 153 and 156 of the bridge. The left branch of the circuit continues via the lower left arm 157 which includes the armature 167 and its resting contact, and a standard resistance 185, to the point 182 representing the lower apex of the bridge. The right branch of the circuit passes through arm 158, which includes the armature 165 and its resting contact, the conductor 172, its branch 172', one winding of the coil being tested (not shown), the branch 171', and conductor 171, which extends to the point 182 where it joins the other branch. From this point the common circuit extends via the resting contact and armature 166, conductor 206, armature 223 and its working contact, conductor 220, resting contact and armature 265, armature 292 and its resting contact and the resistance 298 to battery. The relay 221 also, at its armature 225 closes a point in a locking circuit for relay 247, and at its armature 226 breaks its initial energizing circuit and transfers the impulse lead to a similar two-step relay 227.

The relay 227 is controlled in exactly the same manner as was relay 221 by a subsequent impulse which passes through armature 226 and its working contact; first being operated sufficiently to connect its lower winding in circuit with the grounded conductor 270' and, upon the termination of the impulse, completing its stroke and actuating the remainder of its armatures. The relay 227, at its armatures 231 and 229, disconnects the galvanometer from the restoring circuit including the dry cell C and at the working contacts of these armatures connects the galvanometer in circuit with the Wheatstone bridge. This connection with the bridge extends from a point between arms 153 and 157 of the bridge, through conductor 202, working contact and armature 229, resting contact and armature 241, through the galvanometer, armature 239 and its resting contact, armature 231 and its working contact, conductor 204, and to a point between the arms 156 and 158 of the bridge. The relay 227 also at its armature 233 disconnects the impulse lead from connection with its winding and connects it with the conductor 280, and at its armature 228 and its working contact completes a circuit for the timing relay 290.

The relay 290 at its armature and working contact completes a circuit for slow-to-energize relay 234. However, since the relay 290 is of the weighted spring type an appreciable time expires before its armature comes to rest and permits the energization of the relay 234, only after sufficient time has expired to enable the galvanometer needle to stop moving if it has been actuated. The relay 234, upon operating, at its armature 235 and its working contact completes an operating circuit for the galvanometer recording relay 230. This circuit extends from battery, through the winding of the relay 230, the resistance 236, armature 235 and its working contact, armature 246 and its resting contact, to the conductor 221, which is supplied with ground potential by the start conductor over a previously traced circuit extending to the bridge. The relay 234, also at its armature 237 and its working contact connects the extended impulse conductor 280 with the winding of the two-step relay 238.

So far in the testing operation a coil to be tested has been connected with the testing apparatus, and battery has been placed on the Wheatstone bridge W, in which, the resistance of the winding of the coil and the resistance of the standard are arms. The galvanometer has also been placed in the circuit so that current will flow through it if the arms are not proportional, the direction of the current through the galvanometer being determined by whether the resistance of the coil is greater or less than that of the standard. The first test is made for the high limit of the coil, and therefore the needle of the galvanometer will not deflect from the stop 325 if the winding of the coil is less than the resistance of the standard, but will deflect in case it is greater. Should the resistance of the winding be greater than that of the standard the needle of the galvanometer will be deflected to the left and a contact made by the recording relay armature extension 400 striking the needle which in turn moves the wire contacting device 252 into the mercury well 253, as previously explained. When this occurs, ground is sent out over conductor 255 and through the winding of relay 271 to battery. The relay 271, upon operating, at its armature 272 and its working contact completes a locking circuit for itself independent of the ground formerly supplied to it through the contacts of the galvanometer recording relay; at its armature 280' completes the circuit of the buzzer 300; at its armature 279 opens the circuit over which impulses have heretofore been transmitted to the two-step relays 221 and 227, to stop the testing operation; at armature 278 interrupts the formerly traced circuit of the galvanometer recording relay 230; at its armature 273 and its working contact closes a point in the circuit of the high-voltage breakdown indicating lamp L; and at its armature 274 and its working contact completes the circuit of lamp HC, which visually indicates that the resistance of the coil under test is higher than the limits allowed.

The attendant therefore removes the coil from the set and momentarily restores the key switch K. The momentary restoration of this key causes battery to be removed from the equipment, permitting all operated equipment to restore to its initial position so that the set is again placed in readiness for receiving another coil to be tested.

If the resistance of the coil under test is less than that resistance of the standard the galvanometer needle is not moved in the path of the armature of the reject relay 230 and consequently the test continues. Under these circumstances the next impulse transmitted by the impulse generating relay 159 extends through the armature 237 of relay 234 and its working contact, the resting contact and armature 245 to the midpoint of the winding of relay 238 and to battery. The relay 238 being a two-step relay of the same type and included in substantially the same circuit arrangement as those formerly described takes a short stroke followed at the termination of the impulse to it by a complete stroke. This relay, at its armatures 239 and 241 breaks the galvanometer circuit from connection with the bridge, and at the working contacts of these armatures, reconnects it with the local circuit including the galvanometer needle restoring dry cell C; at its armature 245 disconnects its upper winding from the impulse lead; at its armature 244 and its working contact connects the impulse lead through resting contact and armature 251 to the winding of the two-step relays 247 and 256; at its armature 246 interrupts the traced circuit through the galvanometer recording relay 230, permitting this relay to restore; and at its armature 242 opens the circuit of relay 290. Relay 290, therefore, restores and opens the circuit of relay 234. The relay 234, upon restoring, at its armature 235 opens a second point in the circuit of relay 230, and at its armature 237 opens another point in the initial energizing circuit of relay 238.

Upon the transmission of the next impulse the two-step relays 247 and 256 operate, first their respective armatures 249 and 259 and then the remaining of their armatures. The relay 247 at its armature 251 interrupts its initial energizing circuit; at its armature 250 interrupts the locking circuit of the previously operated two-step relays 221, 227 and 238, permitting these relays to restore to normal; and at armature 248 completes a circuit for the slow release relay 254. Relay 254, upon operating, interrupts a point in the previously traced operating circuit of the two-step relay 221, thereby preventing the operation of this latter relay while the relay 254 remains energized.

Relay 256, at its armature 257 extends the holding ground, supplied over conductor 270 and through the armature 284 and its resting contact to the conductor 205, which extends to the mercury contact relay 163. This relay operates and shunts out portion 155 of the upper right arm of the Wheatstone bridge, which effects the same result as changing the standard 185 to one of low limit resistance. At its armature 261 it interrupts its initial energizing circuit and extends the impulse lead to the energizing winding of the two-step relay 267 via conductor 301, springs of the key switch K², and armature 268 and its resting contact; at its armature 262 breaks a point in the operating circuit of relay 286; and at its armature 258 completes a circuit for relay 263. Relay 263, upon operating, at its armature 264 transfers the light signal control circuit from the high coil lamp HC to the low coil lamp LC; and at armatures 265 and 266 reverses the previously traced connections from battery and ground, respectively, to the Wheatstone bridge. The purpose of reversing the current to the bridge is that, while in the case of a high test the galvanometer is effective to reject a coil if its resistance is higher than that of the standard; it is now desired to have the galvanometer reject a coil if its resistance is lower than that of the new standard, made by shunting out a section of the upper right arm of the bridge.

It will be recalled that upon the energization of relay 247 the circuits of relays 221, 227, and 238 were interrupted, causing these relays to restore their armatures. Since the holding circuit of the relay 247 includes the armature 225 and the grounded working contact of relay 221, the relay 247 also deenergized immediately following the deenergization of relay 221.

The relay 247, upon restoring its armatures, at its armature 250 again connects locking ground potential to the armatures 224, 232, and 243 of the associated respective relays 221, 227, and 238; at its armature 251 again closes a point in its own operating circuit; and at its armature 248 interrupts the circuit of the slow release relay 254. This latter relay is made slow to release in order to give the mercury in relay 163 time to become stabilized before the test is continued and, upon deenergizing, at its armature, again reestablishes the circuit for causing the reenergization, in sequence, of relays 221, 227, 238, and 247.

The test is now repeated during the second cycle of operation of these relays in the same manner as previously described, except that this time the low resistance test of the coil is made. Upon the operation of the relay 238, during the second cycle, the impulse transmitting circuit extends to the relays 247 and 267 in multiple, because of the already operated condition of the relay 256. The relay 247 performs the same function as it did before, while the relay 267, at its armature 269 lights the second winding lamp and, by supplying ground out over conductor 207 completes a circuit for energizing the second winding mercury relay 164. The mercury contact relay 164, at its armature 167 substitutes the standard 184 for the previously used standard 185, and at its armatures 165 and 166 disconnects conductors 172 and 171 from association with the Wheatstone bridge, connected with the first winding of the coil being tested, and substitutes therefore the conductors 173 and 174, connected with the second winding of the coil. The relay 267 also, at its armature 268, disconnects its winding from the extended impulse conductor and connects this conductor to the winding of the two-step relay 281.

During the third cycle of operation of relays 221, 227, 290, 234, and 238, the low test of the second winding is made in the same manner as was the low test of the first winding. This test is followed by the operation of relays 247 and 281, the branch circuit over which 281 operates being completed via the armature 261 and working contact of relay 256, conductor 301, through the normally closed springs of key K², armature 268 and working contact of relay 267, and through the resting contact and armature of the relay 281. The relay 247 performs the same function as in the former tests; the relay 281 at its armature 284 opens the circuit of the low test mercury relay 163, permitting that relay to restore to normal. This modifies the upper right arm of the bridge to the proper condition for testing the coil for too high a resistance. The relay 281 also, at armature 285 extends the impulse circuit through to the relay 286, via conductor 212, armature 142 and its resting contact and the conductor 213.

During the fourth cycle of operation of relays 221, 227, 290, 234, and 238, the testing of the second winding of the coil for too high a resistance takes place. Upon the subsequent energization of the relay 247, relay 286 also operates as a consequence of the energized condition of the relay 281. The relay 286, at its armatures 291 and 293, removes ground and battery, respectively, from the bridge circuit; at its armature 289 short circuits the armature and working contact 237 of the relay 234 so that, during the next fifth cycle of operation of the two-step relays, the time interval is eliminated and the impulse circuit can transfer without delay from the relay 227 to the relay 238. The relay 286 also, at its armature 287, completes a circuit for the relay 141, by way of the conductor 211, and at its armature 288 opens a point in the common operating circuit of lamps HC and LC, and at its front contact closes a point in the operating circuit of the high voltage breakdown indicating lamp L. The relay 141, upon operating, at its armature 142 extends the impulse lead to armature 146, at its armature 143 connects one terminal of the high voltage generator GEN to a terminal of one of the coil windings, over a path extending by way of the resting contact and armature 147, conductor 168, conductor 171 and its branch 171'; and at its armature 144 connects the other terminal of the generator, by way of the winding of the alternating current relay 152, to a terminal of the other coil; over a path including the resting contact and armature 149, conductor 169, and its branch conductor 174. If there is a short circuit between the windings there is a path for the alternating current from the generator GEN which will cause the relay 152 to operate and place ground on the conductor 218 extending to the winding of the reject relay 271, which will operate in the same manner as when operated by ground from the galvanometer recording relay contacts. Since at this time the relay 286 is in energized condition, the operation of the relay 271 will cause the high-voltage breakdown lamp L to be lighted; by ground being supplied to it over conductor 208, armature 296 and its resting contact, armature 288 and its working contact, and through the working contact and armature 273 of the reject relay 271.

At the end of the fifth cycle of operation of the two-step relay group the relay 294 operates in multiple with the relay 247; the impulse circuit at this time having been extended to the relay 294 by way of conductor 280, the working contact and armature 244, armature 262 and its resting contact, armature 285 and its working contact, conductor 212, armature 142 and its working contact, conductor 216 and the upper winding of the relay 294 to battery. The two-step relay 294 operates in the same manner as did the relay 286 and, at its armature 296, closes a point in the operating circuit of the lamp L which is independent of control of relay 286; and at its armature 295 completes the circuit of relay 162. This relay at its armature 146 extends the impulsing lead to the relay 298; at its armatures 147 and 149 closes a circuit between the conductors 168 and 169, thereby connecting the two windings of the coil together; at its armature 151 it also connects the one terminal of the generator GEN through its associated alternating current relay 152, to the conductors 168 and 169; and at its armature 148 connects the other terminal of the generator to the conductor 181, which, through the action of solenoid 103 became connected to the core of the coil under test. In case of a break-down between the windings and the core the alternating current relay 152 will operate to bring about the operation of the reject relay 271, with the same result as that obtained when there is a breakdown between the windings themselves.

If the coil is O. K., at the termination of the sixth cycle of operation of the two-step relays, the impulse subsequently transmitted from the impulse generating relay 159 extends over the traced circuit to the winding of relay 298 and battery. The relay 298, upon operating, at its armature 277 opens the locking circuit of the previously operated relays; at its armature 299 interrupts the circuit over which ground was supplied to the bridge and to the recording relay; and at its armature 275 completes an operating circuit over conductor 210 to the relay 139 and over a branch including armature 135 and its resting contact to the relay 126 in multiple.

The relay 126, upon operating, at its armature 128 and its working contact completes a locking circuit for itself and a circuit for the lamp 133 in multiple; at its armature 129 removes ground from the locking circuit of start relay 177, and at its armature 127 removes ground from the locking circuit of relay 298, permitting these relays to restore their armatures. The lighted lamp 133 indicates to the attendant that the coil in the position designated 106 has been tested, found O. K., and is therefore ready to be removed.

The operation of relay 139 causes a circuit to be completed for the solenoid return magnet 109, which helps restore the solenoid core and its contact springs from the coil terminals upon the deenergization of relay 177.

Upon the release of relay 177 the start circuit at position 108, extending over conductors 181 and 182, is reestablished at the armature 123 and its resting contact; at its armature 124 a point in the operating circuit of relay 114 is opened and at armature 125 a point in the operating circuit of the guard magnet 112 for position 106 is opened. The guard magnet, therefore, deenergizes to permit removal of the coil from position 106.

Upon the release of relay 298, which is slightly delayed owing to its slow release characteristic, the circuit of slow release relay 139 is broken, and this relay restores and again breaks the circuit of return magnet 109. Relays 298 and 139 are made slow to release in order to maintain the circuit of the return magnet closed for a slight interval after the circuit of the solenoid is broken. All circuits and apparatus are now in their normal position, unless a coil has been placed in the loading position 108.

If during the testing operation a coil was placed in this position slow-to-pull-up relays 116 and 136 are now operated from ground supplied over the start conductor 181, conductor 182, resting contact of armature 123, resting contact of armature 132, where the circuit divides one branch extending to the winding of relay 116 and battery and the other branch extending to the winding of relay 136 and battery. The relay 116—and the corresponding relay, 177 of the other position,—is made slow to operate so that the solenoid plunger will not operate before the coil is fully in place and the attendant has had time to remove her hand from the position. Relay 136 is made slow to operate in order to prevent the operation of the O. K. relay 131 should its circuit be closed by relay 136 an instant before ground is removed from the conductor 210 as a result of the deenergization of relay 298.

The relay 136 in operating at its armature 137 connects conductor 209 to the new grounded start conductor 181, via armatures 132, 123 and their resting contacts; at its armature 135 substitutes relay 131 for relay 126 and at its armature 138 transfers the conductor 208 from connection with springs controlled by 126 to similar springs controlled by the relay 131.

The relay 116, upon operating, at its armature 117 completes the circuit of solenoid 104, at armature 121 closes a point in the circuit of guard magnet 113, and at armature 119 completes a circuit for relay 114. The relay 114 in turn completes the circuit of the guard magnet.

The operation of the solenoid 104 of position 108 starts the testing operation of the coil in that position by operating the same spring combination formerly operated by the solenoid 103.

The testing of the coils placed in position 106. However, with the operation of the 106. However, with the operation of the O. K. relay 131, when a coil is in position 108 the relays 139 and 131 are operated instead of relays 139 and 126, due to the energized condition, at this time, of the relay 136. Relay 131, upon operating, locks up in substantially the same manner as did relay 126, and the lamp 134 in multiple with the lock-up winding of 131 serves to indicate that the coil in position 108 has been tested and found O. K. The relay 131 also interrupts the locking circuits of relays 116 and 136 at armature 132 and these relays restore. Relay 116, upon restoring, at its armature 117 opens the circuit of solenoid 104 at its armature 118 reestablishes the start circuit for testing a coil in position 106 at its armature 121 interrupts the circuit of guard magnet 113 and at armature 119 interrupts the circuit of relay 114.

In case a coil has only a single winding, the key $K^2$ is actuated to the left. This transfers the impulse conductor 301 from connection with the relay 267 to the relays 286 and 294 which operate together upon the completion of the low test with the same impulse which operates relay 247. The relays 286 and 294 operating together cause relays 141 and 162 to operate together and place the terminals of the high voltage generator on the winding and the core, respectively. These circuits may be traced as follows: from one terminal of the generator GEN., through armature 148 and its working contact to conductor 181 and to the core of the coil as previously described; and from the other terminal of the generator through the winding of the alternating current relay 152, the armature 151 and its working contact to the multiple lead 195 which, through the medium of the working contacts and armatures 147 and 149, connect with leads 168 and 169, respectively. Since these leads extend to the terminals of the solenoid springs which connect them with different windings of a double-wound coil it will readily be seen that the current from the generator will be applied to the terminals of a single-wound coil irrespective of the position of the terminals of the coil with respect to the two sets of the connections on the solenoid springs. Of course, if there is a short circuit between the winding and the core the relay 152 will operate causing results corresponding to those hereinbefore described under similar circumstances. On the other hand if the coil is O. K., the subsequent impulse transmitted from the impulse generating relay 159 will, as in the testing of a double wound coil, cause relay 238 to again operate and close the operating circuit of the O. K. relay 298 in the manner hereinbefore described.

In some instances it may be desirable to test only one winding of a double wound coil for resistance and both windings for short circuits between the windings and the windings and the core. This may be done by operating the single winding key $K^2$ to the right. With the key in this position springs 311 are separated and springs 312 are brought into contact. This transfers the impulse conductor 301 from connection with the relay 267 to the relay 286, which then operates with relay 247 upon the completion of the low test of the first winding. The break-down tests between the windings and between the windings and core are then made as previously described with the springs of $K^2$ in the position shown.

What is claimed is:

1. In a coil testing equipment, a coil receiving device, means responsive to the placing of a coil in said device to automatically test its winding for proper resistance, a signalling device actuated if the resistance is improper, and a second signalling device operated at the termination of the testing operation if the resistance is proper.

2. In a device for testing coils with iron cores, means for automatically testing the windings for proper resistance, short circuits between the windings themselves and between the core, and signalling devices for automatically indicating the status of the coil.

3. In combination, equipment for testing the resistances of coils having two windings, including a wheatstone bridge and standard resistances, for automatically testing a winding for one abnormal resistance against one of said standards, testing it for a second abnormal resistance with the same standard, and for then testing the other winding in the inverse order with the second standard, and means for automatically indicating the status of the coil under test.

4. In a testing device, a galvanometer, means for preventing the movement of the galvanometer needle from mid-position in one direction, a source of current for biasing the needle in such a direction, test circuits and means for including the galvanometer in them in rapid succession, and means for removing said biasing current from the galvanometer during its connection with a test circuit only and for thereafter always replacing the biasing current on the galvanometer to insure restoration of its needle prior to the next test.

5. In a device for automatically testing a relay coil, means responsive to the receipt of a coil to test the winding for excessive resistance, insufficient resistance and for proper insulation between the winding and core in sequence, and means for automatically stopping the test at any stage at which a defect is found.

6. In a testing device for automatically testing relay coils comprising a plurality of windings on an iron core, of means for receiving a coil, means responsive thereto to cause a plurality of tests as to its electrical properties to be automatically made successively on each of the windings and for then causing a test to be made as regards the electrical condition of the windings with respect to the core, and means for automatically stopping the test at any stage at which a defect is found.

7. In a coil testing device, test circuits, a coil receiving element, means for connecting the core and terminals of the coil with said test circuits, means actuated by the coil when placed within said element for causing the operation of said connecting means, and means included in said test circuits for subsequently testing the coil for proper resistances and for insulation defects between the windings and core, and means for then automatically restoring said connecting means.

8. In an automatic coil testing apparatus, means responsive to the placing of a coil in said apparatus for causing the same to automatically test the coil for any one of a plurality of possible electrical defects, and means for automatically placing a guard over the coil during a certain portion of the testing operation.

9. In an automatic coil testing apparatus, means responsive to the placing of a coil having an iron core in said apparatus for causing the same to be tested for proper resistance and for testing for insulation breakdown between the coil and its core, and means for automatically placing a guard over the coil to protect an attendant against receiving a shock from high voltage current applied to the coil during the breakdown test.

10. In an apparatus for automatically testing coil resistances, a plurality of elements for receiving coils to be tested, means responsive to the placing of one coil in one of said elements for first cutting the other coil receiving element out of service, for causing a cycle of electrical tests to be applied to the coil and for then cutting said other element into service, and means responsive to the presence of a coil placed therein during the test of the coil in the first element for cutting the first used element out of service as soon as the test of the coil associated therewith has been completed and until a like cycle of testing of the second coil has been completed.

11. In a device for testing the electrical characteristics of a coil, means for receiving a coil to be tested, means responsive to the weight of the coil to initiate the testing operation, means for receiving a second coil during the progress of testing the first, and means responsive to the completion of the test of the first coil to automatically cause the testing of the second coil to be initiated.

12. In an automatic coil testing apparatus, means for first testing the electrical conductivity of one winding of a coil and for then testing the electrical conductivity of a second winding thereof, and means for then testing for defective electrical insulation between its windings.

13. In a coil testing apparatus, means for automatically testing the conductivity of the windings of a coil in rapid succession, means for automatically stopping the testing operation when a defect is found, and means for indicating which winding is defective.

14. In a device for testing the electrical characteristics of a coil, a mechanism having contacting devices for connection with the terminals and core of a coil placed in operative relation to said device, means for operating said mechanism, and means operated consequent to the placing of a coil in said device for causing said means to function.

15. In a device for testing the electrical characteristics of a coil, the provision of means operated consequent to the placing of a coil into operative relation to the device for electrically connecting the coil with the testing apparatus of said device.

In witness whereof, I hereunto subscribe my name this 16th day of April, A. D. 1929.

HAROLD C. ROBINSON.